United States Patent [19]

Martin

[11] Patent Number: 5,350,724
[45] Date of Patent: Sep. 27, 1994

[54] POLYOLEFIN POLYMERIZATION PROCESS, PROCESS OF PRODUCING CATALYST, AND CATALYST

[75] Inventor: Joel L. Martin, Bartlesville, Okla.

[73] Assignee: Phillips Petroleum Company, Bartlesville, Okla.

[21] Appl. No.: 58,167

[22] Filed: May 4, 1993

[51] Int. Cl.$^5$ .................... B01J 31/00; C08F 4/64
[52] U.S. Cl. ...................... 502/110; 502/104; 502/111; 502/113; 502/115; 502/119; 526/151
[58] Field of Search ............ 502/104, 110, 111, 113, 502/115, 119

[56] References Cited

U.S. PATENT DOCUMENTS

| | | | |
|---|---|---|---|
| 4,244,838 | 1/1981 | Gessell | 252/429 |
| 4,400,302 | 8/1983 | Goodall et al. | 502/121 |
| 4,401,589 | 8/1983 | Kioka et al. | 252/429 |
| 4,410,451 | 10/1983 | Dietz et al. | 502/110 |
| 4,537,870 | 8/1985 | Hawley | 502/111 |
| 4,551,439 | 11/1985 | Harada et al. | 502/107 |
| 4,742,139 | 5/1988 | Kioka et al. | 526/125 |
| 4,980,330 | 12/1990 | Marchand et al. | 502/125 |

*Primary Examiner*—Asok Pal
*Attorney, Agent, or Firm*—Marianne H. Michel

[57] ABSTRACT

A process for preparing a polymerization catalyst useful for the polymerization of olefins is provided comprising contacting a magnesium compound and a transition metal halide to form a solid product; contacting the solid product with an organoaluminum halide to form a first catalyst component, and contacting the first catalyst component with an activating agent to form a catalyst. Other aspects of the invention provide a catalyst prepared by the above described method and a polymerization process employing the thus prepared catalyst.

10 Claims, No Drawings

POLYOLEFIN POLYMERIZATION PROCESS, PROCESS OF PRODUCING CATALYST, AND CATALYST

BACKGROUND OF THE INVENTION

This invention relates to transition metal catalysts and methods for their production and use in the polymerization of olefins.

In the production of polyolefins, such as for example polyethylene, polypropylene, ethylene-butene copolymers, polymethylpentene, etc., an important aspect of the various processes and catalysts used to produce such polymers is the productivity. By productivity is meant the amount or yield of solid polymer that is obtained by employing a given quantity of catalyst. If the productivity is high enough, then the amount of catalyst residues contained in the polymer is low enough that the presence of the catalyst residues does not significantly affect the properties of the polymer and the polymer does not require additional processing to remove the catalyst residues. As those skilled in the art are aware, removal of catalyst residues from polymer is an expensive process and it is very desirable to employ a catalyst which provides sufficient productivity so that catalyst residue removal is not necessary. High productivities are also desirable in order to minimize catalyst costs.

It is therefore desirable to develop catalysts which provide relatively high catalyst productivity.

SUMMARY OF THE INVENTION

Objects of the present invention are, therefore, to provide an olefin polymerization catalyst with a relatively high productivity and also a process for producing such a catalyst.

In accordance with one aspect of the present invention, a process to prepare a catalyst is provided which comprises (1) contacting a magnesium compound and a transition metal halide to form a solid product, (2) contacting the solid product with an organoaluminum halide to form a first catalyst component, and (3) contacting the first catalyst component with an activating agent to form the catalyst. The magnesium compound contains at least one hydrocarbyl radical. The transition metal halide is a halide of a transition metal selected form Group 4 and Group 5 of the Periodic Table. As used herein by the term "Periodic Table" is meant the Periodic Table of the Elements shown as the new IUPAC form on the inside front cover of *Handbook of Chemistry and Physics*, 70th Edition, CRC Press, Inc. (1990).

In accordance with other aspects of the invention a catalyst produced by the above described process and a polymerization process employing the catalyst are provided.

DETAILED DESCRIPTION OF THE INVENTION

The magnesium compound contains a t leas t one hydrocarbyl radical, wherein the hydrocarbyl radical is selected from alkyl, cycloalkyl, aryl, alkaryl, and aralkyl hydrocarbyl radicals containing 1 to 20 carbon atoms per radical.

Suitable magnesium compounds include dihydrocarbylmagnesium compounds and Grignard reagents. Examples of suitable magnesium compounds include, dimethylmagnesium, diethylmagnesium, dibutylmagnesium, n-butyl-sec-butylmagnesium, dipentylmagnesium, didodecylmagnesium, diphenylmagnesium, dibenzylmagnesium, dicyclohexylmagnesium, di(4-t-butylphenyl)magnesium, methylmagnesium chloride, ethylmagnesium chloride, isopropylmagnesium chloride, tert-butylmagnesium chloride, n-butylmagnesium chloride, sec-butylmagnesium chloride, pentylmagnesium chloride, dodecylmagnesium chloride, phenylmagnesium chloride, benzylmagnesium chloride, cyclohexylmagnesium chloride, methylmagnesium bromide, ethylmagnesium bromide, n-butylmagnesium bromide, sec-butylmagnesium bromide, tert-butylmagnesium bromide, pentylmagnesium bromide, dodecylmagnesium bromide, phenylmagnesium bromide, benzylmagnesium bromide, cyclohexylmagnesium bromide, methylmagnesium iodide, ethylmagnesium iodide, n-butylmagnesium iodide, sec-butylmagnesium iodide, tert-butylmagnesium iodide, pentylmagnesium iodide, dodecylmagnesium iodide, phenylmagnesium iodide, benzylmagnesium iodide, cyclohexylmagnesium iodide, and mixtures thereof. The presently preferred compounds are dialkylmagnesium compounds in which each alkyl group contains 1 to 12 carbon atoms, more preferably 1 to 6 carbon atoms. The most preferred compounds due to availability and performance are dibutylmagnesium compounds.

The transition metal halide is a halide of a transition metal selected from Group 4 and Group 5 metals of the Periodic Table. Titanium halides are the preferred compounds and titanium tetrachloride is especially preferred because it produces excellent, results and is readily available.

The molar ratio of the transition metal halide to the magnesium compound can be selected over a relatively broad range. Generally the molar ratio is within the range of about 0.1:1 to about 10:, preferably from 0.2:1 to 2:1.

The magnesium compound and the transition metal halide, can be reacted in the presence of a liquid diluent or solvent, or when at least one of the reagents is in the liquid state during the reaction, the use of diluent can be omitted. The magnesium compound and the transition metal halide are normally mixed together in a suitable dry (essential absence of water) diluent or solvent, which is essentially inert to these components and the product produced. By the term "inert" is meant that the diluent does not chemically react with the dissolved components such as to interfere with the formation of the product or the stability of the product once it is formed. Such diluents include, for example, n-pentane, n-hexane, n-heptane, methylcyclohexane, toluene, and xylenes. Aromatic solvents are preferred because the solubility of the magnesium compound and the transition metal halide is higher in aromatic solvents as compared to aliphatic solvents, particularly at low temperatures. Xylenes are most preferred.

Generally the amount of solvent or diluent employed can be selected over a broad range. Usually the amount of solvent or diluent is within the range of about 1 to about 100 cc per gram of magnesium compound, preferably from 20 to 100 cc per gram.

Temperatures for contacting the magnesium compound and the transition metal halide are generally within the range of from about 0° C. to about 150° C. and preferably from 10° C. to 150° C. The contacting temperatures employed could be higher if the pressure employed is above atmospheric pressure.

The pressure employed during contacting of the magnesium compound and the transition metal halide does not appear to be a significant parameter and can vary broadly. Generally the pressure is within the range of about 0.1 to about 5.0 MPa.

Generally, the time required for contacting the magnesium compound and the transition metal halide is within the range of about 5 minutes to about 10 hours, although in most instances a time within the range of 15 minutes to 3 hours is sufficient. Following the contacting operation, the resulting solution can be filtered to remove any undissolved material or extraneous solid, if desired.

According to a preferred embodiment, an alcohol is also employed in preparing the solid product in step (1). Alcohols that can be employed include either monohydroxy or polyhydroxy alcohols containing from 1 to 20 carbon atoms, preferably from 1 to 16 carbon atoms. The alcohol can be aliphatic or aromatic alcohols. The aliphatic alcohols can be saturated or unsaturated. Suitable alcohols include methanol, ethanol, 2,2,2-trifluoroethanol, isopropanol, n-butanol, sec-butanol, tert-butanol, 1-pentanol, 2-pentanol, 1-hexanol, 2-hexanol, 2-ethylhexanol, 1-octanol, decanol, dodecanol, hexadecanol, cyclohexanol, diols such as 1,2-ethanediol, 1,2-propanediol, 1,3-propanediol, 1,4-butanediol, 1,2-hexanediol, 1,2-decanediol, 1,2-octanediol, and 1,10-decanediol, glycerols, benzyl alcohol, methylbenzyl alcohol, isopropylbenzyl alcohol, substituted and unsubstituted phenols, and mixtures thereof.

Preferably, the alcohol employed in preparing the solid product is a substituted or unsubstituted phenol containing from 6 to 16 carbon atoms. Typical examples include phenol, 2-methylphenol, 3-methylphenol, 4-methylphenol, 4-phenylphenol, 2,6-di-t-butyl-4-methylphenol, 2-chlorophenol, 3-chlorophenol, 4-chlorophenol, 2-bromophenol, 3-bromophenol, 4-bromophenol, 2-fluorophenol, 3-fluorophenol, 4-fluorophenol, 4-sec-butylphenol, 4-ethylphenol, 4-methoxyphenol, and mixtures thereof. Of those phenols, 4-phenylphenol is the most preferred.

The molar ratio of the alcohol employed relative to the transition metal halide can vary over a relatively broad range. Generally the molar ratio is within a range of from about 0.1:1 to about 10:1 and preferably from 0.2:1 to 5:1. In a particularly preferred embodiment, the alcohol and the magnesium compound are contacted prior to contacting with the transition metal compound when forming the solid product.

The organoaluminum halide contains at least one hydrocarbyl radical, wherein the hydrocarbyl radical is selected from hydrocarbyl radicals selected from alkyl, cycloalkyl, aryl, alkaryl, and aralkyl hydrocarbon radicals containing 1 to 20 carbon atoms per radical, preferably from 1 to 16 carbon atoms, and more preferably from 1 to 12 carbon atoms. Typical examples include methylaluminum dibromide, ethylaluminum diiodide, dimethylaluminum chloride, diethylaluminum chloride, diisopropylaluminum chloride, diisobutylaluminum chloride, dodecylaluminum dibromide, dimethylaluminum bromide, methyl-p-propylaluminum bromide, di-n-octylaluminum bromide, dicyclohexylaluminum bromide, di-n-decylaluminum chloride, ethylisobutylaluminum chloride, diphenylaluminum chloride, dieicosylaluminum chloride, di-n-propylaluminum chloride, methylaluminum sesquibromide, ethylaluminum sesquiiodide, ethylaluminum sesquichloride, and mixtures thereof. Ethylaluminum sesquichloride is readily available and has been employed with good results, and is therefore especially preferred.

The molar ratio of the transition metal halide to the organoaluminum halide can be selected over a relatively broad range. Generally, the molar ratio is within a range of from about 0.1:1 to about 10:1 and preferably within a range of 0.1:1 to 3:1.

The contacting of the solid product and the organoaluminum halide can be carried out either in the presence of a liquid diluent, or when at least one of the reagents is in the liquid state, in the absence of such diluent. Preferably, the solid product of step (1) is contacted with a hydrocarbon solution of the organoaluminum halide. Diluents or solvents which can be employed in preparing the solid product, as described above, are also suitable for contacting the solid product and the organoaluminum halide.

The temperature employed while contacting the solid product and the organoaluminum halide is about 0° C. to about 150° C., preferably within the range of about 10° C. to about 150° C.

The pressure employed while contacting the solid product and the organoaluminum halide can be selected over a broad range. Generally the pressure is within the range of about 0.1 to about 5.0 MPa.

The solid product, as contacted with the organoaluminum halide, is contacted for a sufficient time at the above mentioned temperature, generally within a range of about 5 minutes to about 10 hours, preferably from 15 minutes to 3 hours, to insure that contacting of the components is complete. The slurry can be stirred or agitated during contacting.

Thereafter, the thus produced first catalyst component, can be recovered from the slurry by filtration or decantation. The first catalyst component can then be washed with a suitable material, such as a hydrocarbon, to remove any soluble material which may be present. If the first catalyst component is decanted, the slurry can be stored under dry nitrogen or the first catalyst component can be dried and then stored under nitrogen.

The activating agent comprises at least one halogen-containing compound of an element selected from Groups 4, 5, 14, and 15 of the Periodic Table capable of adding halogen to the catalyst. Examples of suitable activating agents include $CCl_4$, $COCl_2$, $CH_2Cl_2$, $SnCl_4$, $SiCl_4$, $SiHCl_3$, $Si_4Cl_{10}$, $CH_3SiCl_2H$, $C_2H_5SiCl_3$, $(CH_3)_2SiCl_2$, $Si_2OCl_6$, $Si(OC_2H_5)Cl_3$, $\Phi SiHCl_2$ where $\Phi$ is a phenyl radical, $\Phi_2SiCl_2$, $TiCl_4$, $TiBr_4$, $TiI_4$, $VCl_4$, $VOCl_3$, $ZrCl_4$, $ZrOCl_3$, and acid chlorides having the formula R'COCl where R' is an aliphatic or aromatic radical, preferably containing 1 to 20 carbon atoms such as benzoyl chloride and acetyl chloride, and mixtures thereof, Preferably, the activating agent comprises chlorine-containing compounds of titanium, silicon, or carbon, or mixtures thereof, more preferably the activating agent comprises chlorine-containing compounds of titanium, and most preferably comprises titanium tetrachloride.

While the weight ratio of the activating agent to the first catalyst component can be selected over a relatively broad range, generally the weight ratio is within a range of about 0.1:1 to about 100:1 and preferably from 0.5:1 to 75:1. Following the treatment of the first catalyst component with the activating agent, the surplus activating agent can be removed by washing the solid catalyst with a dry (essential absence of water) liquid such as a hydrocarbon of the type previously discussed, n-hexane, or xylene for example. The thus activated catalyst can be stored under an inert atmosphere such as dry nitrogen.

Generally the reaction of the first catalyst component add the activating agent can be carried out neat or in a liquid medium in which the activating agent is soluble. Any suitable diluent can be employed. Examples include normally liquid hydrocarbons such as n-pentane, n-hexane, n-heptane, cyclohexane, benzene, chlorobenzene, and xylene.

The temperature employed in contacting the first catalyst component and the activating agent can be selected over a relatively broad range, generally in the range of about 0° C. to about 150° C., preferably 10° C. to 150° C.

The pressure employed in contacting the first catalyst component and the activating agent can be selected over a relatively broad range, generally the pressure will be in the range of about 0.1 MPA to about 5.0 MPa.

The contacting time of the first catalyst component and the activating agent can be selected over a broad range and generally is within the range of about 10 minutes to about 10 hours, preferably from 15 minutes to 3 hours. It is noted that the order of addition is not important and either component can be added to the other.

A variety of polymerizable compounds are suitable for use in the process of the present invention. Olefins which can be homopolymerized or copolymerized with the invention catalysts include aliphatic mono-1-olefins. While the invention would appear to be suitable for use with any aliphatic mono-1-olefin, those olefins having from 2 to 18 carbon atoms are most often used.

The present catalysts are particularly useful for the polymerization of 4-methyl-1-pantene and are especially well suited providing high productivity.

While it may not be necessary in all instances to employ a cocatalyst with the catalyst of the present invention, the use of cocatalysts is recommended for best results. The cocatalysts suitable for use in accordance with the invention can be selected from among the hydrides and organometallic compounds of metals of Groups 1, 2, 12, and 13 of the Periodic Table. Some typical examples include lithium alkyls, dialkyl zinc compounds, and organoaluminum compounds. Of the organometallic cocatalysts, organoaluminum compounds are preferred. The organoaluminum cocatalysts are compounds containing at least one hydrocarbyl radical individually selected from hydrocarbyl radicals containing 1 to 20 carbon atoms per radical. Typical examples include, trimethylaluminum, triethylaluminum, triisopropylaluminum, tridecylaluminum, triesosylaluminum, tricyclohexylaluminum, triphenylaluminum, diethylealuminum chloride, and 2-methylpentyldiethylaluminum. Triethylaluminum is preferred since this compound has produced excellent results.

The molar ratio of the organometallic compound of the cocatalyst to the transition metal halide of the first catalyst component is not particularly critical and can be selected over a relatively broad range. Generally, the molar ratio of the organometallic compound of the cocatalyst to the transition metal halide of the first catalyst component is within a range of about 0.01 to about 1500:1, preferably from 0.01 to 200:1.

In some cases it may be desirable to use a multi-component cocatalyst system comprising triethylaluminum and either aromatic esters such as ethylanisate, ethylbenzoate and methyl-p-toluate, etc.; or silanes such as diphenyl dimethoxysilane, triphenyl ethoxysilane, methyl triethoxysilane, etc.

The polymerization process according to the present invention can be conducted in a solution phase process, in the presence or absence of an inert hydrocarbon diluent, in a particle form process, or in a gas phase process.

The polymerization process employing the catalysts and cocatalysts as above described can be performed either batchwise or continuously. In a batch process, for example, a stirred autoclave is prepared for use by first purging with an inert gas such as nitrogen and then with a suitable compound, such as isobutane for example. When the catalyst and cocatalyst are employed, either can be charged to the reactor first or they can be charged simultaneously through an entry port under an isobutane purge. After closing the entry port, hydrogen if used, is added, and then a diluent, if used, is added to the reactor. The reactor is heated to the desired reaction temperature, which for polymerizing 4-methyl-1-pentene, for example, is generally within a range of about 20° C. to about 120° C and the monomer is then admitted and maintained at a partial pressure within a range of about 0.1 MPa to about 5.0 MPa for best results. At the end of the designated reaction period, the polymerization reaction is terminated and the unreacted olefin and diluent can be vented. The polymer can then be collected as a free-flowing white solid and dried to obtain the product.

In a continuous process, for example, a suitable reactor such as a loop reactor can be continuously charged with suitable quantities of solvent or diluent, catalyst, cocatalyst, polymerizable compounds and hydrogen, if any, and in any desirable order. The reactor product can be continuously withdrawn and the polymer recovered as appropriate, generally by flashing the diluent (solvent) and unreacted monomers and drying the resulting polymer.

The olefin polymers made with the catalysts of this invention are useful in preparing articles by conventional polyolefin processing techniques such as injection molding, rotational molding, and extrusion of film.

The following example will serve to show the present invention in detail by way of illustration and not by way of limitation.

EXAMPLE

The example compares relative catalyst activity of catalysts treated with various activating agents with those that have not been so treated.

The first catalyst component was prepared by the following procedure. A solution of 4.17 g (36.6 mmoles) dibutylmagnesium in 43 mL heptane was added to 240 mL xylene which contained 12.4 g 4-phenylphenol. The reactor was heated to 100° C. and held for 1 hour and the mixture was stirred. The reactor was cooled to room temperature, 2.0 mL TiCl$_4$ were added to form a solid product in slurry. The slurry was stirred at room temperature for 1 hour. The reactor was then heated to 100° C. and held for 1 hour with stirring. The reactor was cooled to room temperature and allowed to stand overnight. The reactor was then heated to 50° C. and 23 mL ethylaluminum sesquichloride (25 wt. %) were added. The reactor temperature was maintained at 50° C. for 1 hour and then the slurry was filtered in a glove box. The brownish-violet solid was washed with 40 mL of heptane and dried to produce the first catalyst component. The yield was 22.14 g. Indicated portions of the first catalyst component without activation, were employed in the polymerization of 4-methyl-1-pentene, Table 1, Runs 101 and 102.

Other portions of the first catalyst component were treated with various activating agents. Each catalyst was prepared by treating 2.00 g of the first catalyst component with the activating agent indicated in Table 1, Runs 103 to 111. The treatment was conducted at 100° C. and the temperature was held for 1 hour. The thus activated catalyst was filtered and washed 2 times with ]10 mL heptane and dried.

The catalysts were employed in the polymerization of 4-methyl-1-pantene. The polymerizations were conducted in a one gallon stirred stainless steel autoclave. To the clean reactor, 1300 g of liquid 4-methyl-1-pantene (4MP1) was charged. 8.4 ml of triethylaluminum cocatalyst (15 wt. % in heptane) were added, followed by a weighed amount of dried catalyst, as indicated in Table 1. The reactor was sealed and the desired amount of hydrogen, approximately 25 psig pressure drop over a 325 cc vessel, was added. The reactor was then brought to about 50° C. and maintained for about 1 hour. The reactor was then cooled to about 25° C. as the pressure was vented. The liquid remaining in the reactor was then siphoned away and the remaining solid polymer was removed from the reactor and dried.

In the following table, "Activation Treatment" indicates the reagents employed in treating a 2.00 g portion of the first catalyst component described above. "Catalyst" is the mg of catalyst employed in the polymerization. "Activity" is the grams of polymethylpentene (PMP) produced per gram catalyst per hour.

TABLE 1

| Run | Catalyst (mg) | Activity g PMP/g · hr |
|---|---|---|
| Activation Treatment - None | | |
| 101 | 23.9 | 300 |
| 102 | 21.3 | 270 |
| Activation Treatment - 10 mL TiCl$_4$ | | |
| 103 | 24.0 | 7,000 |
| 104 | 20.9 | 7,300 |
| Activation Treatment - 5 mL TiCl$_4$, 5 mL SiCl | | |
| 105 | 18.6 | 6,800 |
| 106 | 25.1 | 7,600 |
| Activation Treatment - 10 mL SiCl$_4$ | | |
| 107 | 27.9 | 3,300 |
| 108 | 21.0 | 4,300 |
| Activation Treatment - 10 mL TiCl$_4$, 10 mL TiCl$_4$* | | |
| 109 | 18.5 | 8,800 |
| 110 | 11.4 | 7,600 |
| Activation Treatment - 5 mL C$_6$H$_5$SiCl$_3$, 5 mL TiCl$_4$ | | |
| 111 | 27.8 | 7,000 |

*added in sequence

Table 1 demonstrates the effectiveness of the activation treatment in increasing the activity of the catalysts.

While this invention has bean described in detail for the purpose of illustration, it is not to be construed as limited thereby, but is intended to cover all changes and modifications within the spirit and scope thereof.

That which is claimed is:

1. A process for preparing a polymerization catalyst comprising
   (1) contacting a magnesium compound, a 4-phenylphenol, and titanium tetrachloride to form a solid product,
   wherein said magnesium compound is a dialkylmagnesium compound wherein each alkyl group contains 1 to 12 carbon atoms;
   (2) contacting said solid product and an organoaluminum halide to form a first catalyst component,
   wherein said organoaluminum halide contains at least one hydrocarbyl radical selected from hydrocarbyl radicals containing 1 to 12 carbon atoms per radical; and
   (3) contacting said first catalyst component and an activating agent to form said catalyst,
   wherein said activating agent is titanium tetrachloride, silicon tetrachloride, C$_6$H$_5$SiCl$_3$, or mixtures thereof.

2. A process according to claim 1 wherein said magnesium compound is a dialkylmagnesium compound wherein each alkyl group contains 1 to 6 carbon atoms.

3. A process according to claim 2 wherein said magnesium compound is a dibutylmagnesium compound.

4. A process according to claim 1 wherein said phenol and said magnesium compound are contacted prior to contacting with said titanium tetrachloride.

5. A process according to claim 1 wherein said organoaluminum halide is ethylaluminum sesquichloride.

6. A process according to claim 1 wherein the molar ratio of said titanium tetrachloride in said solid product to said magnesium compound is within the range of about 0.1: to about 10:1;
   wherein the molar ratio of said titanium tetrachloride in said first catalyst component to said organoaluminum halide is within the range of about 0.1:1 to about 10:1; and
   wherein the weight ratio of said activating agent to said first catalyst component is within the range of about 0.1:1 to about 100:1.

7. A catalyst produced according to the process of claim 1.

8. A process for preparing a polymerization catalyst comprising:
   (1) contacting dibutylmagnesium, a 4-phenylphenol, and then titanium tetrachloride to form a solid product;
   (2) contacting said solid product and ethylaluminum sesquichloride to form a first catalyst component; and
   (3) contacting said first catalyst component and an activating agent to form said catalyst,
   wherein said activating agent is titanium tetrachloride, silicon tetrachloride, C$_6$H$_5$SiCl$_3$, or mixtures thereof.

9. A process according to claim 8 wherein the molar ratio of said titanium tetrachloride in said solid product to said dibutylmagnesium is within the range of 0.2:1 to 2:1;
   wherein the molar ratio of said titanium tetrachloride in said first catalyst component to said ethylaluminum sesquichloride is within the range of 0.1:1 to 3:1; and
   wherein the weight ratio of said activating agent to said catalyst is within the range of 0.5:1 to 75:1.

10. A catalyst produced according to the process of claim 8.

* * * * *